(12) United States Patent
Funakoshi

(10) Patent No.: US 9,842,483 B2
(45) Date of Patent: Dec. 12, 2017

(54) INFORMATION PROCESSING SYSTEM FOR REDUCING LOAD ON A SERVER

(71) Applicant: HONDA MOTOR CO., LTD., Tokyo (JP)

(72) Inventor: Kotaro Funakoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/286,099

(22) Filed: Oct. 5, 2016

(65) Prior Publication Data

US 2017/0116842 A1 Apr. 27, 2017

(30) Foreign Application Priority Data

Oct. 26, 2015 (JP) .................................. 2015-210048

(51) Int. Cl.
  *G08B 21/00* (2006.01)
  *G08B 21/24* (2006.01)
  *G06Q 10/10* (2012.01)

(52) U.S. Cl.
  CPC ........... *G08B 21/24* (2013.01); *G06Q 10/109* (2013.01)

(58) Field of Classification Search
  None
  See application file for complete search history.

(56) References Cited

U.S. PATENT DOCUMENTS

| | | | | |
|---|---|---|---|---|
| 2012/0034906 A1* | 2/2012 | Ueno | ...................... | H04W 4/02 455/414.1 |
| 2013/0215116 A1* | 8/2013 | Siddique | ............ | G06Q 30/0643 345/420 |
| 2016/0210602 A1* | 7/2016 | Siddique | ............ | G06Q 20/0453 |
| 2017/0011426 A1* | 1/2017 | Marchenko | ........ | G06Q 30/0266 |

FOREIGN PATENT DOCUMENTS

JP 4408335 11/2009

* cited by examiner

*Primary Examiner* — Adolf Dsouza
(74) *Attorney, Agent, or Firm* — Rankin, Hill & Clark LLP

(57) ABSTRACT

In an information processing system, a terminal includes: a condition information generation unit that uses at least one of a first condition and a second condition to generate condition information; a state information generation unit that generates state information; a transmission unit that transmits the condition and state information at a predetermined time interval; a reception unit that receives notice information; a reminder generation unit that generates a reminder when it is determined that the state information satisfies one of the first and second conditions when receiving the notice information; and a notification unit that notifies a user of the reminder. An information processing apparatus includes: an acquisition unit that acquires the condition and state information; a condition determination unit that generates the notice information when it is determined that the state information satisfies one of the first and second conditions; and an output unit that transmits the notice information.

10 Claims, 8 Drawing Sheets

FIG. 2

| IDENTIFIER | TARGET POSITION INFORMATION | TARGET TIME INFORMATION | ... |
|---|---|---|---|
| ID1001 | AA BUILDING AT SHIBUYA | SEVENTEEN O'CLOCK, JULY 7, 2015 | ... |

FIG. 3

| IDENTIFIER | TARGET POSITION INFORMATION | TARGET TIME INFORMATION | SENSOR INFORMATION | | |
|---|---|---|---|---|---|
| | | | MOVEMENT SPEED | ATMOSPHERIC TEMPERATURE | ... |
| ID1001 | LATITUDEXX1 LONGITUDEYY1 | SEVENTEEN O'CLOCK, JULY 7, 2015 | ... | ... | ... |
| ID1001 | LATITUDEXX2 LONGITUDEYY2 | EIGHTEEN O'CLOCK AND FIFTY MINUTES, JULY 9, 2015 | ... | ... | ... |
| ... | ... | ... | ... | ... | ... |

FIG. 4

| IDENTIFIER | COORDINATE OF TARGET POSITION | TARGET TIME INFORMATION | ... |
|---|---|---|---|
| ID1001 | COORDINATE OF AA BUILDING AT SHIBUYA | SEVENTEEN O'CLOCK, JULY 7, 2015 | ... |
| ID1002 | COORDINATE OF AA BUILDING AT SHIBUYA | EIGHTEEN O'CLOCK AND THIRTY MINUTES, JULY 8, 2015 | ... |
| ID1003 | COORDINATE OF BB BUILDING AT SHINJUKU | TWENTY FIRST O'CLOCK, JULY 7, 2015 | ... |
| ... | ... | ... | ... |

INFORMATION PROCESSING SYSTEM FOR REDUCING LOAD ON A SERVER

CROSS-REFERENCE TO RELATED APPLICATION

Priority is claimed on Japanese Patent Application No. 2015-210048, filed on Oct. 26, 2015, the contents of which are incorporated herein by reference.

BACKGROUND

Field of the Invention

The present invention relates to an information processing system, a terminal, an information processing method, a terminal information processing method, and a program.

Background

A mobile terminal registers to a server a message that prompts a user to take action when the mobile terminal is present at a predetermined time and at a designated position. The mobile terminal transmits position information received by a GPS (Global Positioning System) to the server. The position information includes time information indicating the time at which the position information is acquired. The server uses the information sent by the mobile terminal and determines a position where the mobile terminal is present. Systems have been proposed in which, when the determined position is in a predetermined distance range of the registered designated position and the time information included in the position information is in a predetermined time range that includes the predetermined time, a reminder is sent from the server to the mobile terminal (for example, refer to Japanese Patent No. 4408335). The reminder is a message, for example, that notifies a user of a schedule at a preset time.

SUMMARY

However, according to a configuration described in Japanese Patent No. 4408335, the server issues the reminder based on the position information and the time information acquired from the mobile terminal. Therefore, according to the technique described in Japanese Patent No. 4408335, when the number of users of the system is increased and thereby the number of mobile terminals is increased, the server narrows down the time information and the position information for each mobile terminal, and therefore, a load in the server is increased.

In view of the foregoing, an object of an aspect of the present invention is to provide an information processing system, a terminal, an information processing method, a terminal information processing method, and a program capable of reducing a load in a server in an information processing system that sends a reminder.

(1) In order to achieve the above object, an information processing system according to an aspect of the present invention includes a terminal and an information processing apparatus, wherein the terminal includes: a condition information generation unit that acquires a first condition and a second condition and uses at least one of the acquired first condition and the acquired second condition to generate condition information; a state information generation unit that acquires information based on the first condition and information based on the second condition and uses information that corresponds to the condition information of the acquired information to generate state information; a transmission unit that transmits the condition information to the information processing apparatus and transmits the state information to the information processing apparatus at a predetermined time interval; a reception unit that receives notice information from the information processing apparatus; a reminder generation unit that generates a reminder when it is determined that the state information satisfies one of the first condition and the second condition when receiving the notice information; and a notification unit that notifies a user of the generated reminder, and wherein the information processing apparatus includes: an acquisition unit that acquires the condition information and the state information transmitted by the terminal; a condition determination unit that generates the notice information when it is determined that the acquired state information satisfies one of the first condition and the second condition included in the condition information; and an output unit that transmits the notice information to the terminal.

(2) In the information processing system according to an aspect of the present invention, the first condition may be target position information, the second condition may be target time information, the information based on the first condition may be current position information indicating a current position, and the information based on the second condition may be current time information indicating a current time.

(3) In the information processing system according to an aspect of the present invention, the terminal may change the predetermined time interval at which the current position is acquired and transmitted depending on a distance between the current position included in the current position information and a target position included in the target position information.

(4) In the information processing system according to an aspect of the present invention, the terminal may generate performance information indicating that the user has been notified of the reminder and transmit the generated performance information to the information processing apparatus, and the information processing apparatus may terminate a determination whether or not the state information satisfies one of the first condition and the second condition included in the condition information in response to the received performance information.

(5) In the information processing system according to an aspect of the present invention, the notification unit of the terminal may notify the user of the reminder by using at least one of an image, speech, and vibration.

(6) In the information processing system according to an aspect of the present invention, in the terminal, the condition information generation unit may acquire the target position information and the target time information and use the acquired target position information to generate the condition information; the state information generation unit may acquire the current position information based on the target position information and the current time information based on the target time information and use the current position information that corresponds to the condition information of the acquired information to generate the state information; and the reminder generation unit may generate the reminder when it is determined that the current time information satisfies the target time information when receiving the notice information, and in the information processing apparatus, the condition determination unit may generate the notice information when it is determined that the current position information included in the state information satisfies the target position information included in the condition information.

(7) In order to achieve the above object, a terminal according to another aspect of the present invention includes: a condition information generation unit that acquires a first condition and a second condition and uses at least one of the acquired first condition and the acquired second condition to generate condition information; a state information generation unit that acquires information based on the first condition and information based on the second condition and uses information that corresponds to the condition information of the acquired information to generate state information; a transmission unit that transmits the condition information to an information processing apparatus and transmits the state information to the information processing apparatus at a predetermined time interval; a reception unit that receives notice information from the information processing apparatus; a reminder generation unit that generates a reminder when it is determined that the state information satisfies one of the first condition and the second condition when receiving the notice information; and a notification unit that notifies a user of the generated reminder.

(8) In order to achieve the above object, an information processing method according to another aspect of the present invention is an information processing method in an information processing system that includes a terminal and an information processing apparatus. The information processing method includes: (a) by way of a condition information generation unit of the terminal, acquiring a first condition and a second condition and using at least one of the acquired first condition and the acquired second condition to generate condition information; (b) by way of a transmission unit of the terminal, transmitting the condition information to the information processing apparatus; (c) by way of an acquisition unit of the information processing apparatus, acquiring the condition information transmitted by the terminal; (d) by way of a state information generation unit of the terminal, acquiring information based on the first condition and information based on the second condition and using information that corresponds to the condition information of the acquired information to generate state information; (e) by way of the transmission unit of the terminal, transmitting the state information to the information processing apparatus at a predetermined time interval; (f) by way of an acquisition unit of the information processing apparatus, acquiring the state information transmitted by the terminal; (g) by way of a condition determination unit of the information processing apparatus, generating notice information when it is determined that the state information acquired in (c) satisfies one of the first condition and the second condition included in the condition information; (h) by way of an output unit of the information processing apparatus, transmitting the notice information to the terminal; (i) by way of a reception unit of the terminal, receiving the notice information from the information processing apparatus; (j) by way of a reminder generation unit of the terminal, generating a reminder when it is determined that the state information satisfies one of the first condition and the second condition when receiving the notice information; and (k) by way of a notification unit of the terminal, notifying a user of the reminder generated in (j).

(9) In order to achieve the above object, a terminal information processing method according to another aspect of the present invention includes: (a) by way of a condition information generation unit, acquiring a first condition and a second condition and using at least one of the acquired first condition and the acquired second condition to generate condition information; (b) by way of a transmission unit, transmitting the condition information to an information processing apparatus; (c) by way of a state information generation unit, acquiring information based on the first condition and information based on the second condition and using information that corresponds to the condition information of the acquired information to generate state information; (d) by way of the transmission unit, transmitting the state information to the information processing apparatus at a predetermined time interval; (e) by way of a reception unit, receiving notice information from the information processing apparatus; (f) by way of a reminder generation unit, generating a reminder when it is determined that the state information satisfies one of the first condition and the second condition when receiving the notice information; and (g) by way of a notification unit, notifying a user of the reminder generated in (f).

(10) In order to achieve the above object, another aspect of the present invention is a non-transitory computer-readable recording medium including a program that causes a computer of a terminal to execute: (a) acquiring a first condition and a second condition and using at least one of the acquired first condition and the acquired second condition to generate condition information; (b) transmitting the condition information to an information processing apparatus; (c) acquiring information based on the first condition and information based on the second condition and using information that corresponds to the condition information of the acquired information to generate state information; (d) transmitting the state information to the information processing apparatus at a predetermined time interval; (e) receiving notice information from the information processing apparatus; (f) generating a reminder when it is determined that the state information satisfies one of the first condition and the second condition when receiving the notice information; and (g) notifying a user of the reminder generated in (f).

According to the above configuration of (1), (7), (8), (9), or (10), since the information processing apparatus does not perform all the reminder notification processes as in the related art but can perform the processes such that part of the processes are distributed to the terminal, it is possible to reduce a load in the information processing apparatus (server).

According to the above configuration of (2) or (6), the reminder notification process can be performed in a distributed manner such that the terminal performs a process with respect to a point in time and the information processing apparatus performs a process with respect to a position, and therefore, it is possible to reduce a load in the information processing apparatus.

According to the above configuration of (4), the information processing apparatus can recognize that the reminder has been performed. As a result, according to the above configuration of (4), the information processing apparatus can terminate a process relating to the reminder that has been performed by the terminal.

According to the above configuration of (3), in the terminal, the acquired time interval of current position information is changed depending on the distance between the current position and the target position, and therefore, it is possible to reduce the consumption of electric power at the terminal. Further, when the acquired time interval of current position information is long corresponding to the distance between the current position and the target position, a load in the information processing apparatus is reduced.

According to the above configuration of (5), it is possible to notify the user of the reminder by using at least one of an image, speech, and vibration.

BRIEF DESCRIPTION OF THE DRAWINGS

FIG. 2 is a view showing an example of condition information to which an identifier is added according to the present embodiment.

FIG. 3 is a view showing an example of state information to which an identifier is added according to the present embodiment.

FIG. 4 is a view showing an example of information stored in a reminder database of an information processing apparatus according to the present embodiment.

DESCRIPTION OF THE EMBODIMENTS

First, an outline of the present embodiment will be described.

In the present embodiment, a user operates a terminal such as a smartphone and inputs a position (hereinafter, referred to as target position information) and time (hereinafter, referred to as target time information) at which the user wants to be notified of a reminder. The terminal registers the input information on the terminal and transmits one of the input information which is, for example, the target position information to an information processing apparatus such as a server. After transmitting the target position information, the terminal transmits current position information acquired at a predetermined time interval to the information processing apparatus. The information processing apparatus determines whether or not a current position is in a predetermined range that includes a target position and transmits, when the current position is in the predetermined range, information indicating that the terminal is present in the predetermined range. That is, the information processing apparatus of the present embodiment does not perform a determination with respect to all the information input at the terminal but performs a determination, for example, only with respect to one of the input information. Further, the terminal determines, when receiving the information indicating that the terminal is present in the predetermined range from the information processing apparatus, only whether or not a current time is in a predetermined time that includes a target time and notifies the user of a reminder when the current time is in the predetermined time. In this way, in the present embodiment, the reminder notification process is performed by the terminal and the information processing apparatus in a distributed manner.

Hereinafter, the embodiment of the present invention will be described with reference to the drawings.

Figure 1:
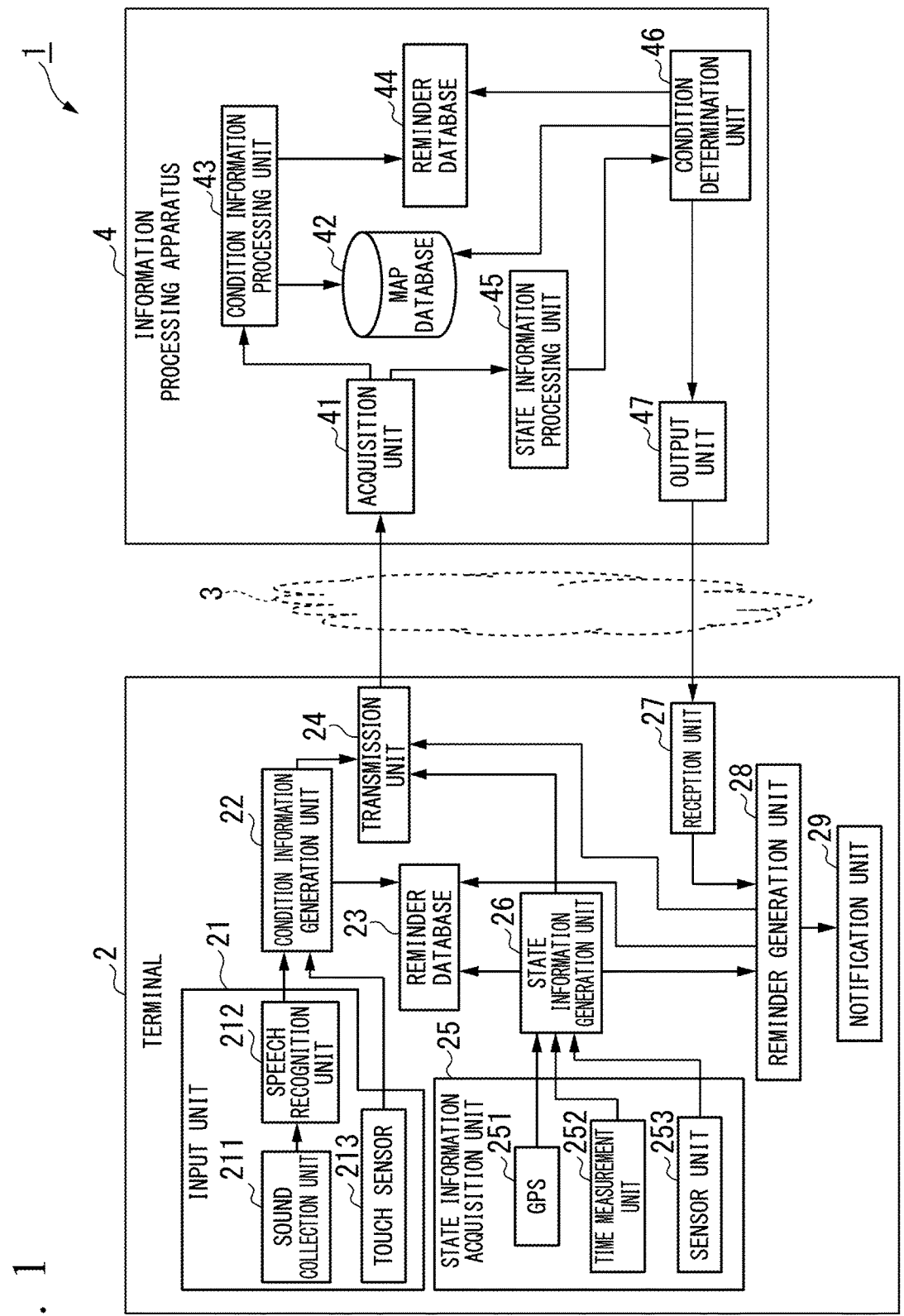
FIG. 1 is a block diagram showing a configuration of an information processing system according to the present embodiment.

FIG. 1 is a block diagram showing a configuration of an information processing system 1 according to the present embodiment. As shown in FIG. 1, the information processing system 1 includes a terminal 2 and an information processing apparatus 4. The terminal 2 and the information processing apparatus 4 exchange information via a network 3. The network 3 is, for example, the Internet that uses the IP (Internet Protocol) as a communication protocol. The network 3 may have a configuration that includes, for example, a mobile phone network, a wireless LAN (Local Area Network), and the like.

<Configuration of Terminal 2, Configuration of Information Processing Apparatus 4>

The terminal 2 includes an input unit 21, a condition information generation unit 22, a reminder database 23, a transmission unit 24, a state information acquisition unit 25, a state information generation unit 26, a reception unit 27, a reminder generation unit 28, and a notification unit 29. The input unit 21 includes a sound collection unit 211, a speech recognition unit 212, and a touch sensor 213. The state information acquisition unit 25 includes a GPS 251, a time measurement unit 252, and a sensor unit 253.

The information processing apparatus 4 includes an acquisition unit 41, a map database 42, a condition information processing unit 43, a reminder database 44, a state information processing unit 45, a condition determination unit 46, and an output unit 47.

<Function of Terminal 2>

First, the terminal 2 is described. The terminal 2 is, for example, a smartphone, a tablet terminal, a mobile game apparatus, a vehicle, a robot having a communication function, and the like. The present embodiment is described using an example in which the terminal 2 is a smartphone.

The input unit 21 acquires notice condition information input by a user and outputs the acquired notice condition information to the condition information generation unit 22.

The sound collection unit 211 is a microphone. The sound collection unit 211 converts a collected speech signal into an electric signal and outputs the converted speech signal to the speech recognition unit 212.

The speech recognition unit 212 calculates, with respect to the speech signal output by the sound collection unit 211, a speech feature quantity of the speech signal for each frame. The speech recognition unit 212 performs a speech recognition process by using the calculated speech feature quantity and a speech recognition model stored in the speech recognition unit 212. The speech recognition unit 212 determines a word having the highest likelihood calculated by using the speech recognition model as a recognition result for the calculated speech feature quantity. The speech recognition unit 212 outputs text data indicating the recognition result to the condition information generation unit 22. The text data includes at least target position information (first condition) indicating a target position and target time information (second condition) indicating a scheduled target time at which a predetermined action is to be performed at the target position. The target position information is at least one of, for example, a geographical name and information indicating a landmark such as a station name, a building name, a shop name, or a park name. The target time information includes information representing year, month, date, and time. For example, the speech recognition unit 212 may detect a speech zone based on the intensity of a sound signal and perform a speech recognition process for a speech signal in the detected speech zone.

The touch sensor 213 is a touch panel sensor provided on an image display unit included in the notification unit 29. The touch sensor 213 detects an operation result by the user of the terminal 2 and outputs detection result information indicating the detected result to the condition information generation unit 22. The detection result information includes at least the target position information and the target time information.

The information acquired by the sound collection unit 211 or the touch sensor 213 is a condition on which the user is notified of a reminder. Therefore, in the following description, the information that includes at least one of the target position information and the target time information is also referred to as notice condition information.

The condition information generation unit 22 acquires the notice condition information output by the input unit 21. That is, the condition information generation unit 22 acquires the text data output by the speech recognition unit 212 or the detection result information output by the touch sensor 213. The condition information generation unit 22 generates condition information based on at least one of the target position information and the target time information included in the acquired text data or the acquired detection result information. The condition information is at least one of the target position information and the target time information. The condition information generation unit 22 adds an identifier by which the terminal 2 is identified to the generated condition information, outputs the condition information to the transmission unit 24, and writes the condition information on the reminder database 23. In the following description, an example in which the condition information is target position information is described. It is assumed that information included in the condition information is determined in advance for between the terminal 2 and the information processing apparatus 4. For example, a designer of the information processing system 1 may determine in advance information that the designer wants the information processing apparatus 4 to process. The identifier is, for example, the IMEI (International Mobile Equipment Identity), the MEID (Mobile Equipment IDentifier) of the terminal 2, or the like.

The reminder database 23 stores state information in association with the condition information. Examples of information stored in the reminder database 23 are described below.

The transmission unit 24 transmits the condition information to which the identifier is added output by the condition information generation unit 22 to the information processing apparatus 4 via the network 3. The transmission unit 24 transmits the state information to which the identifier is added output by the state information generation unit 26 to the information processing apparatus 4 via the network 3. The state information transmitted by the transmission unit 24 to the information processing apparatus 4 may include at least current position information. The transmission unit 24 transmits the performance information to which the identifier is added output by the reminder generation unit 28 to the information processing apparatus 4 via the network 3.

The state information acquisition unit 25 acquires detection information described below and outputs the acquired detection information to the state information generation unit 26.

The GPS 251 receives radio waves from a GPS satellite, acquires position information where the terminal 2 is used based on the received radio waves, and outputs to the state information generation unit 26 the acquired position information as the current position information. The current position information is information that is based on the target position information and indicates the coordinate of the current position by using latitude and longitude. The GPS 251 may acquire the position information based on a communication with a base station (not shown). The GPS 251 may extract a GPS time included in the received radio waves, calculate a current time based on the extracted GPS time, and output current time information indicating the calculated current time to the state information generation unit 26. The current time information is information based on the target time information.

The time measurement unit 252 acquires a current time via a communication with the base station and outputs current time information indicating the acquired current time to the state information generation unit 26. The time measurement unit 252 may measure time by counting reference clock signals generated by the terminal 2 and output the measured time information to the state information generation unit 26 as the current time information.

The sensor unit 253 is a sensor that detects the state of the terminal 2 and outputs sensor information detected by the sensor to the state information generation unit 26. The sensor unit 253 is, for example, at least one of an acceleration sensor that detects a tilt of the terminal 2 and the like, an illumination sensor that detects an illuminance in the vicinity of the terminal 2, a temperature sensor that detects a temperature in the vicinity of the terminal 2, a humidity sensor that detects a humidity in the vicinity of the terminal 2, an atmospheric pressure sensor that detects an atmospheric pressure in the vicinity of the terminal 2, and the like.

The GPS 251, the time measurement unit 252, and the sensor unit 253 acquire each of the information at a predetermined time interval. Alternatively, the GPS 251, the time measurement unit 252, and the sensor unit 253 may acquire at least current time information when receiving the notice information from the information processing apparatus 4.

At least the current position information and the current time information of the current position information output by the GPS 251, the current time information output by the time measurement unit 252, and the sensor information output by the sensor unit 253 are input to the state information generation unit 26. The current position information, the current time information and the sensor information are also referred to as detection information. The state information generation unit 26 generates state information by using the input detection information. The state information is information that includes at least the current position information and the current time information. The state information generation unit 26 outputs the generated state information to the reminder generation unit 28. The state information generation unit 26 adds an identifier to the state information and outputs the state information to the transmission unit 24. The state information generation unit 26 writes the generated state information on the reminder database 23. The state information generation unit 26 may update the state information stored in the reminder database 23 and, for example, write only the latest state information and the previous state information just before the latest state information on the reminder database 23.

The reception unit 27 receives the notice information transmitted by the information processing apparatus 4 via the network 3 and outputs the received notice information to the reminder generation unit 28.

The reminder generation unit 28 determines whether or not state information is input from the state information generation unit 26 in a first predetermined time since the reception unit 27 outputs the notice information. The first predetermined time is, for example, one minute. The first predetermined time may be a different value depending on a movement speed of the user of the terminal 2, weather, atmospheric temperature, altitude, current time, and the like. The reminder generation unit 28 calculates the movement speed by using, for example, first current position information at a first time acquired from the GPS 251 and second current position information at a second time. For example, the reminder generation unit 28 may acquire information relating to the weather or atmospheric temperature of the current position on the Internet by the reception unit 27 via the network 3. When it is determined that the state information is input in a predetermined time, the reminder generation unit 28 refers to the condition information stored in the reminder database 23 and determines whether or not the current time is in a second predetermined time that includes a target time. Alternatively, when it is determined that the state information is not input in the predetermined time, the reminder generation unit 28 reads out the latest state information and the condition information stored in the reminder database 23 and determines whether or not the current time is in the second predetermined time that includes the target time. The second predetermined time is, for example, five minutes. When the current time is in the second predetermined time that includes the target time, the reminder generation unit 28 determines that the current position is in a predetermined range that includes the target position and the current time is in the second predetermined time that includes the target time and generates a reminder. The reminder generation unit 28 outputs the generated reminder to the notification unit 29. Further, when the reminder is output to the notification unit 29, the reminder generation unit 28 adds an identifier and the target time information to performance information indicating that the reminder has been performed and outputs the performance information to the transmission unit 24.

The notification unit 29 notifies the user of the reminder output by the reminder generation unit 28 by using at least one of an image, speech, vibration, and the like. The notification unit 29 includes an image display device, a speech output device, a vibration device, and the like. The image display device is, for example, a liquid crystal display. The speech output device is, for example, a speaker. The vibration device is, for example, a vibrator.

<Function of Information Processing Apparatus 4>

Next, the information processing apparatus 4 is described. The information processing apparatus 4 is, for example, a server.

The acquisition unit 41 is a reception unit. The acquisition unit 41 receives the condition information, the state information, or the performance information transmitted by the terminal 2 via the network 3. The acquisition unit 41 outputs the received condition information, the received state information, or the received performance information to the condition information processing unit 43 and the state information processing unit 45.

The map database 42 stores attribution information of each landmark in association with information by which a landmark is identified. The information by which a landmark is identified is, for example, a station name of a railroad or the like, a building name, a park name, a square name, a facility name, a nickname, or the like. The attribution information of a landmark includes, for example, the coordinate (latitude, longitude) of a landmark and the address of a landmark. The map database 42 may further store, for example, information of a premises map of a station of a railroad or the like or information of a premises map of premises (for example, a university campus) formed of a plurality of buildings. The information processing apparatus 4 may not include the map database 42. The map database 42 may be connected to the information processing apparatus 4 via the network 3.

The condition information processing unit 43 extracts condition information from the information output by the acquisition unit 41 and converts the target position information included in the extracted condition information into a coordinate (latitude, longitude) with reference to the map database 42. The condition information processing unit 43 associates the converted coordinate with the identifier and writes the coordinate on the reminder database 44. When target time information included in the condition information is included, the condition information processing unit 43 may also write the target time information in association with the above-described information on the reminder database 44.

The reminder database 44 stores a coordinate of a target position and a target date and time in association with each identifier. Examples of the information stored in the reminder database 44 are described below.

The state information processing unit 45 extracts state information from the information output by the acquisition unit 41 and outputs current position information included in the extracted state information to the condition determination unit 46. The state information processing unit 45 extracts performance information from the information output by the acquisition unit 41 and outputs the extracted performance information to the condition determination unit 46.

When the state information is input from the state information processing unit 45, the condition determination unit 46 determines, with reference to the reminder database 44, whether or not the current position information included in the state information is in a predetermined range having a center at the coordinate of the target position in association with the identifier. The predetermined range is described below. When it is determined that the current position is in the predetermined range, the condition determination unit 46 generates notice information indicating that the terminal 2 is present in the predetermined range and outputs the generated notice information to the output unit 47.

When the performance information is input from the state information processing unit 45, the condition determination unit 46 deletes, from the reminder database 44, the target time information and the coordinate of the target position in association with the identifier included in the performance information. When a plurality of coordinates of target positions and a plurality of target time information are associated with one identifier and are stored in the reminder database 44, the condition determination unit 46 deletes, from the reminder database 44, a coordinate of a target position and target time information that coincides with the target time information included in the performance information.

The output unit 47 is a transmission unit. The output unit 47 transmits the notice information output by the condition determination unit 46 to the terminal 2 via the network 3.

An example of condition information, an example of state information, and an example of information stored in the reminder database 44 are described.

First, an example of condition information is described.

FIG. 2 is a view showing an example of condition information to which an identifier is added according to the present embodiment. In an example shown in FIG. 2, target position information and target time information are associated with an identifier in the information transmitted to the information processing apparatus 4.

Next, an example of state information is described.

FIG. 3 is a view showing an example of state information to which an identifier is added according to the present embodiment. As shown in FIG. 3, current position information, current time information, and sensor information are associated with an identifier in the information transmitted to the information processing apparatus 4.

Next, an example of information stored in the reminder database 44 is described.

FIG. 4 is a view showing an example of information stored in the reminder database 44 of the information processing apparatus 4 according to the present embodiment. The example shown in FIG. 4 is an example in which the target position information and the target time information are included in the condition information. In the example shown in FIG. 4, for example, a coordinate of the AA building at Shibuya and "seventeen o'clock, July 7, 2015" as target time information are associated with an identifier ID1001.

<Display Image Example of Terminal 2>

Next, an example of a display image displayed in the image display unit included in the notification unit 29 of the terminal 2 is described.

Figure 5:
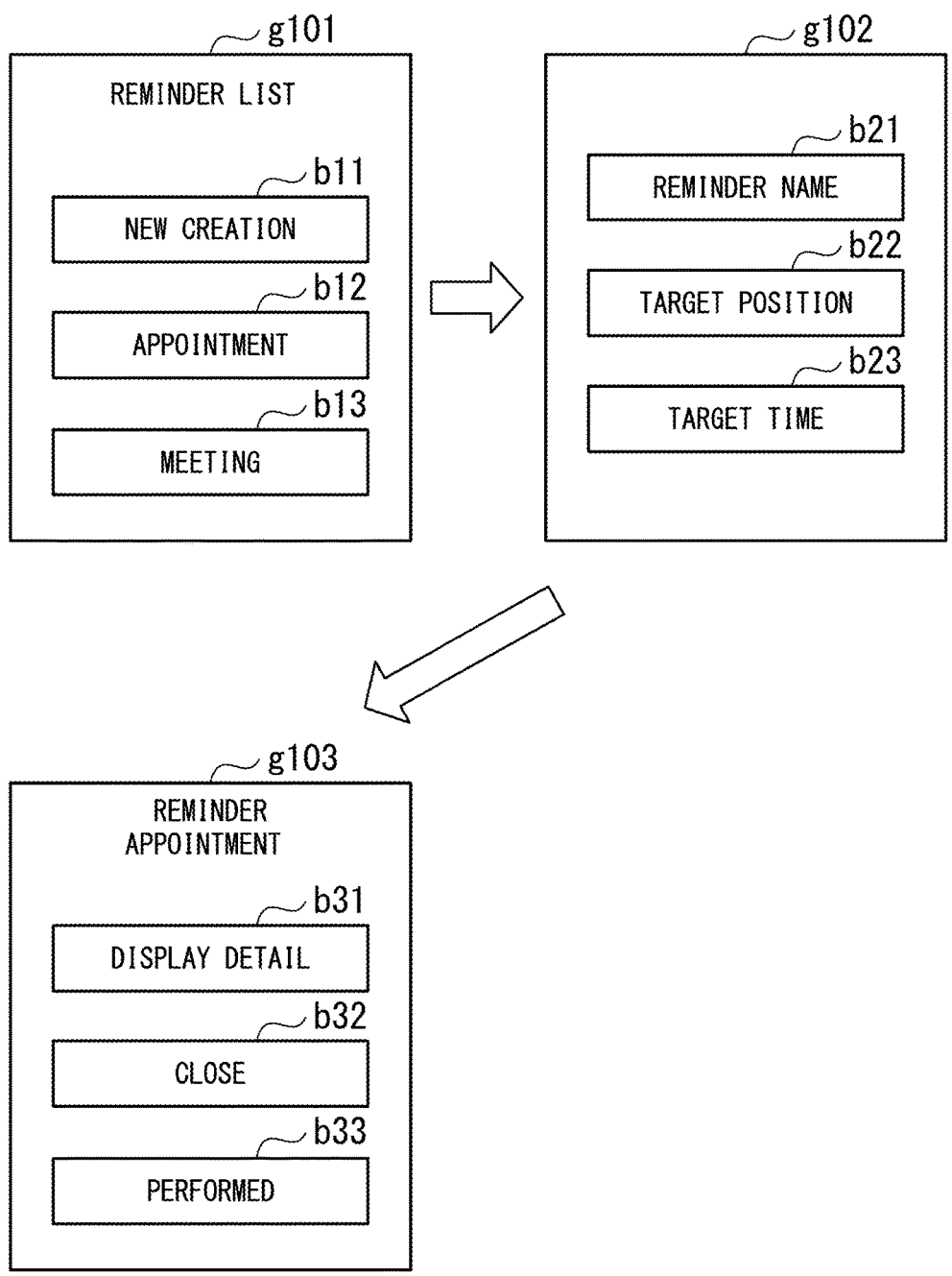
FIG. 5 is a view showing an example of a display image displayed in an image display unit included in a notification unit of a terminal according to the present embodiment.

FIG. 5 is a view showing an example of a display image displayed in the image display unit included in the notification unit 29 of the terminal 2 according to the present embodiment. An image indicated by a reference numeral g101 of FIG. 5 is an example of a display image when registering notice condition information. The display image includes an image b11 of a new creation button, an image b12 that represents a registered "appointment", and an image b13 that represents a registered "meeting". When registering new notice condition information, the user selects the image b11 of the new creation button. The selected result is detected by the touch sensor 213. When referring to or edit registered notice condition information, the user selects, for example, the image b12 that represents the "appointment".

An image indicated by a reference numeral g102 of FIG. 5 is an example of a display image when the image b11 of the new creation button is selected. The display image includes a button image b21 used to edit a reminder name, a button image b22 used to input a target position, and a button image b23 used to input a target time. The user selects the button image b21 used to edit a reminder name and selects or inputs a reminder name, for example, "shopping". The user selects the button image b22 used to input a target position and inputs information relating to a target position for which a reminder is registered, for example, a geographical name or a landmark name. The user selects the button image b23 used to input a target time and selects or inputs a year, month, date, and time for which a reminder is registered.

An image indicated by a reference numeral g103 of FIG. 5 is an example of a display image at the time of notification of a reminder.

The display image includes a button image b31 used to display the detail of the reminder, a button image b32 used to close the notification image of the reminder, and a button image b33 used to confirm that the reminder has been performed. When the user is notified of a reminder, and the user wants to confirm the detailed content of the registered reminder, the user selects the button image b31 used to display the detail of the reminder. Thereby, the registered information of the reminder name, the target position, and the target time is displayed. When the user wants to repeat the notification even after the user has been notified of the reminder, the user selects the button image b32 used to close the notification image of the reminder. Thereby, the terminal 2 and the information processing apparatus 4 confirm the registered condition again, for example, five minutes later, and when the condition is satisfied, the terminal 2 again performs notification of the reminder. After the user is notified of the reminder, when the user wants to complete notification of the reminder, the user selects the button image b33 used to confirm that the reminder has been performed. Thereby, afterward, the terminal 2 does not perform notification relating to the reminder.

In the example shown in FIG. 5, an example is described in which the user operates the touch sensor 213 and registers notice condition information, and notification is performed via the image display unit included in the notification unit 29; however, the embodiment is not limited thereto. The registration of notice condition information may be performed by speech. The notification unit 29 may perform notification by using speech or vibration. The type of notification may be selected, for example, by a user's operation of the touch sensor 213 or may be selected by speech.

<Example of Position Range in which Information Processing Apparatus 4 Detects Terminal 2>

Figure 6:
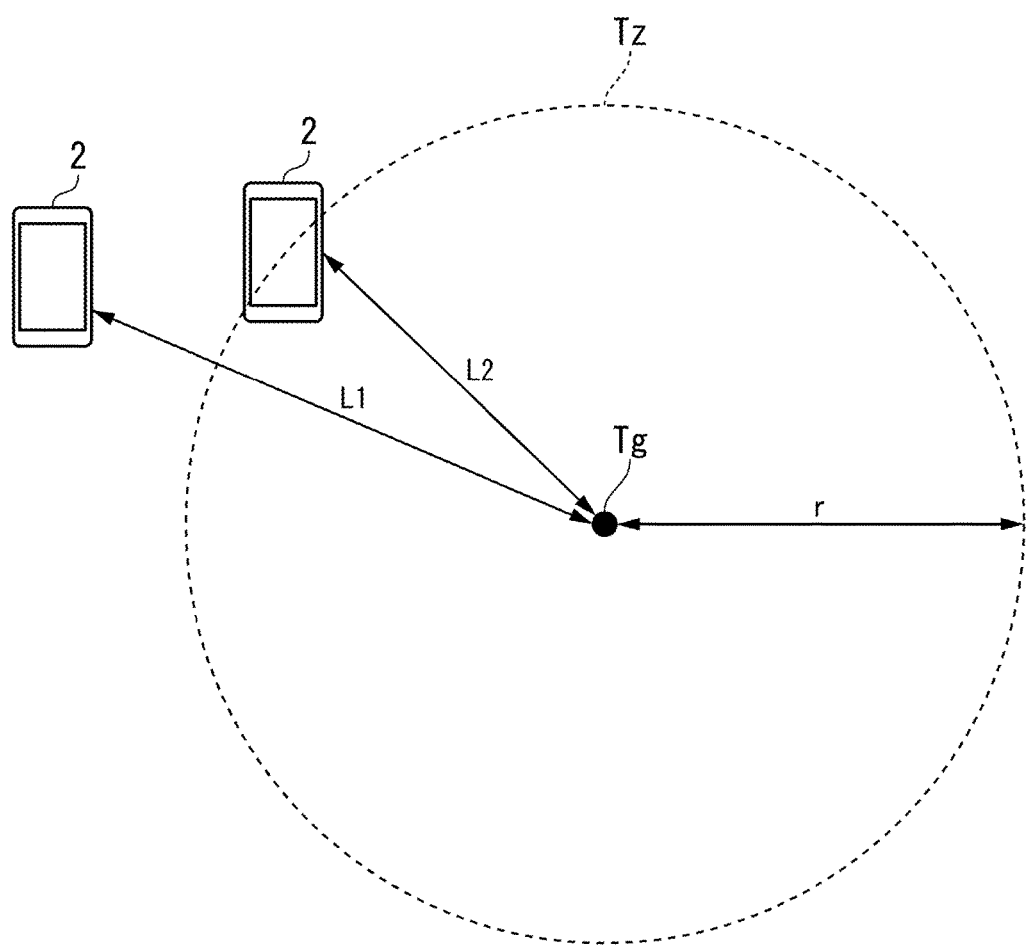
FIG. 6 is a view showing an example of a position range in which the information processing apparatus detects the terminal according to the present embodiment.

Next, an example of a position range in which the information processing apparatus 4 detects the terminal 2 is described. FIG. 6 is a view showing an example of a position range in which the information processing apparatus 4 detects the terminal 2 according to the present embodiment. In FIG. 6, a reference numeral Tg represents a target position. A region indicated by a chain line circle Tz is the above-described predetermined range. As shown in FIG. 6, the predetermine range is a range in a circle having a radius r and having a center at the target position Tg. The shape of the range shown in FIG. 6 is an example, and the shape of the range is not limited to a circle; the shape may be an oval, a square, a polygon, a shape of premises of a station, or the like.

When the position of the terminal 2 is at a distance L1 from the target position Tg, the distance L1 is greater than the radius r, and therefore, the information processing apparatus 4 determines that the terminal 2 is not in a predetermined range. When the position of the terminal 2 is at a distance L2 (<L1) from the target position Tg, the distance L2 is smaller than the radius r, and therefore, the information processing apparatus 4 determines that the terminal 2 is in the predetermined range.

<Example of Predetermined Time Interval at which Terminal 2 Acquires and Transmits Information>

Figure 7:
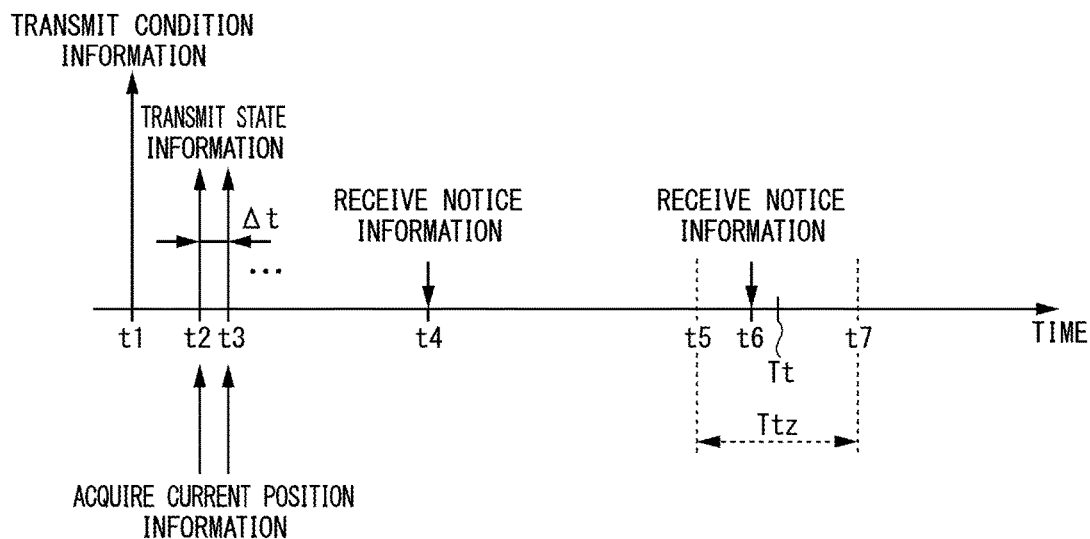
FIG. 7 is a view showing an example of a predetermined time interval at which the terminal acquires and transmits information according to the present embodiment.

Next, an example of a predetermined time interval at which the terminal 2 acquires and transmits information is described. FIG. 7 is a view showing an example of a predetermined time interval at which the terminal 2 acquires and transmits information according to the present embodiment. In FIG. 7, the horizontal axis represents time. A time Tt is a target time, and a time Ttz from a time t5 to a time t7 is a second predetermined time. As shown in FIG. 7, the second predetermined time Ttz includes the target time Tt.

After the user inputs notice condition information, the terminal 2 uses target position information and target time information included in the input notice condition information to generate condition information and transmits the generated condition information to the information processing apparatus 4 at a time t1.

At timings of times t2, t3, . . . having a predetermined time interval Δt, the terminal 2 acquires current position information at which the terminal 2 is used and transmits state information generated based on the acquired current position information to the information processing apparatus 4.

It is assumed that the user moves in a predetermined range of the registered target position at a time t4. The time t4 is not included in the second predetermined time Ttz. Thereby, the terminal 2 is present in the predetermined range at the time t4, and therefore, the information processing apparatus 4 transmits notice information to the terminal 2. The terminal 2 receives the notice information at the time t4. The terminal 2 determines that the time t4 is not included in the predetermined time Ttz and does not perform notification of a reminder.

It is assumed that the user moves in a predetermined range of the registered target position at a time t6. The time t6 is included in the second predetermined time Ttz. Thereby, the terminal 2 is present in the predetermined range at the time t6, and therefore, the information processing apparatus 4 transmits notice information to the terminal 2. The terminal 2 receives the notice information at the time t6. The terminal 2 determines that the time t6 is included in the predetermined time Ttz and performs notification of a reminder.

<Example of Process Sequence of Terminal 2>

Figure 8:
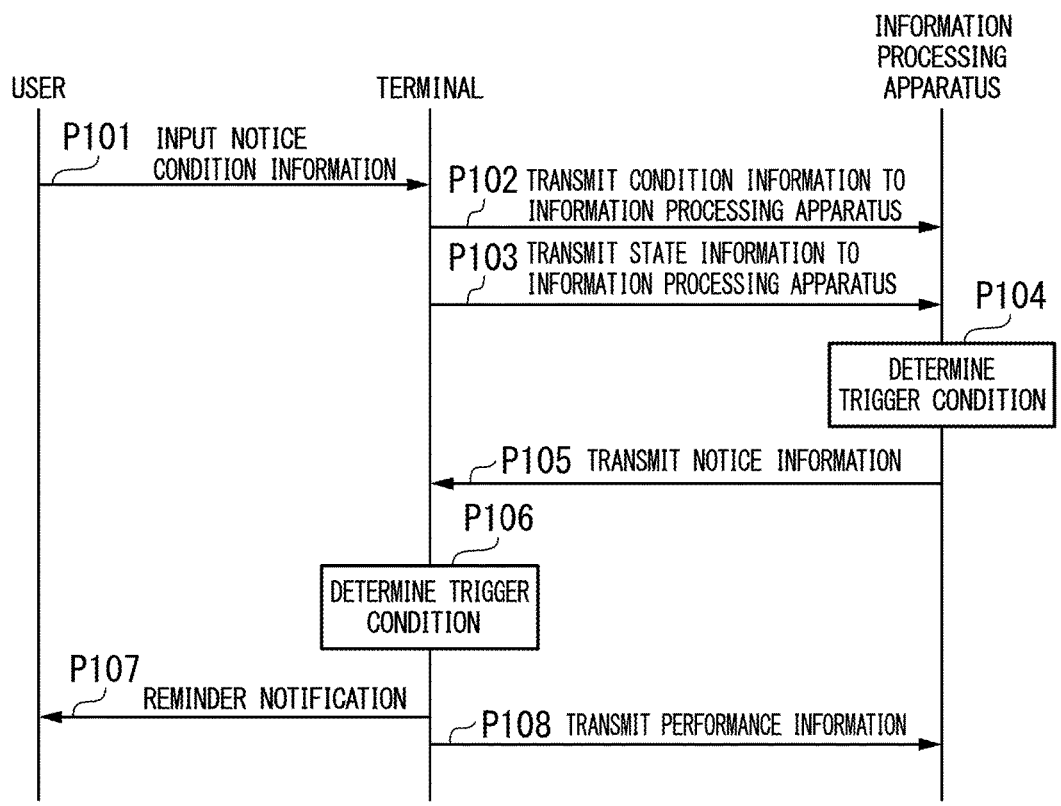
FIG. 8 is a timing chart showing an example of a process sequence of the terminal and the information processing apparatus according to the present embodiment.
Figure 9:
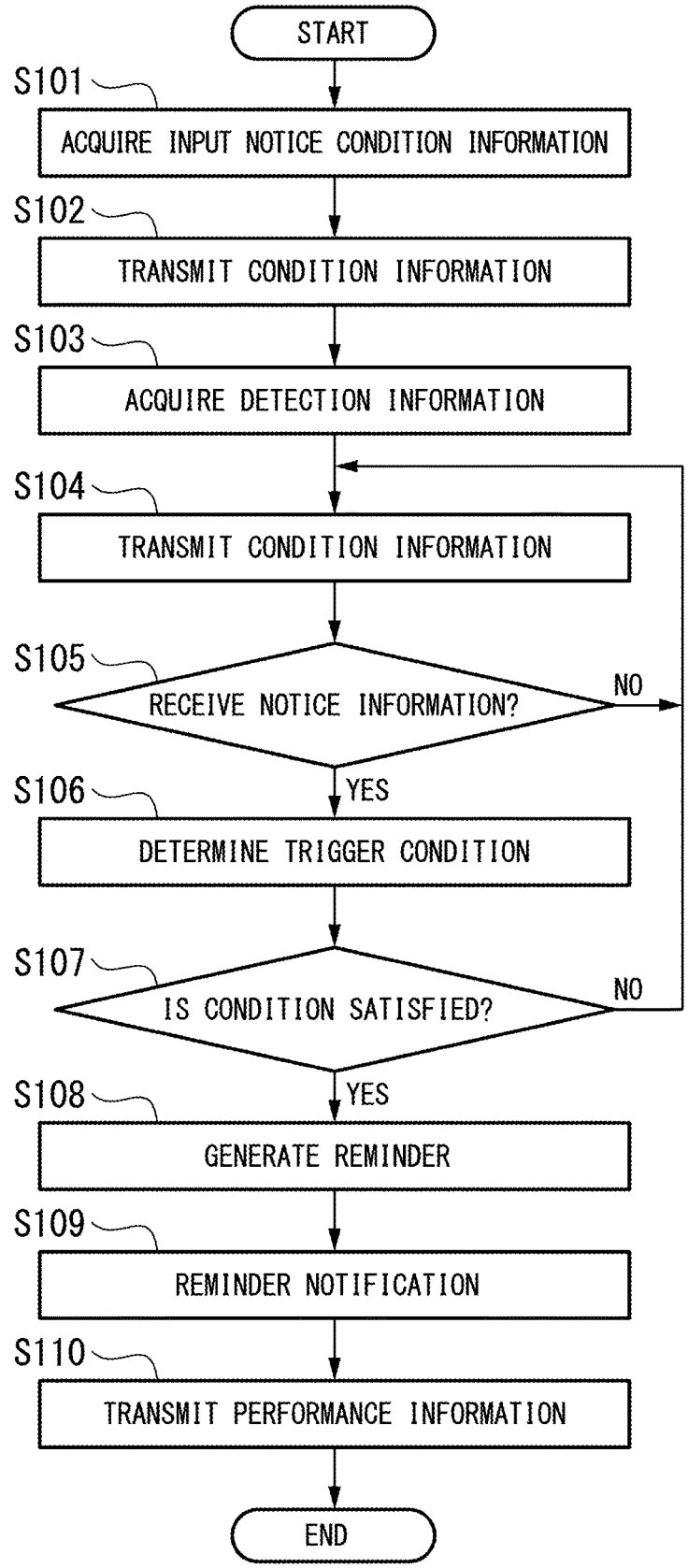
FIG. 9 is a flowchart showing an example of a process sequence of the terminal according to the present embodiment.

Next, an example of a process sequence of the terminal 2 is described using FIG. 9 with reference to FIG. 8. FIG. 8 is a timing chart showing an example of a process sequence of the terminal 2 and the information processing apparatus 4 according to the present embodiment. FIG. 9 is a flowchart showing an example of a process sequence of the terminal 2 according to the present embodiment.

First, the user operates the terminal 2 to input notice condition information including a target position and a target time (FIG. 8, P101).

(Step S101) The input unit 21 acquires the input notice condition information.

(Step S102) The condition information generation unit 22 generates condition information based on the acquired notice condition information and transmits the condition information to which an identifier is added to the information processing apparatus 4 via the transmission unit 24 (FIG. 8, P102). Subsequently, the condition information generation unit 22 writes the generated condition information on the reminder database 23.

(Step S103) The state information acquisition unit 25 acquires detection information.

(Step S104) The state information generation unit 26 generates state information that corresponds to the condition information by using the acquired detection information. When the condition information is target position information, the state information that corresponds to the condition information is current position information. Subsequently, the state information generation unit 26 transmits the condition information to which the identifier is added to the information processing apparatus 4 via the transmission unit 24 (FIG. 8, P103). The state information generation unit 26 may also transmit the condition information together with the state information to the information processing apparatus 4 via the transmission unit 24. Subsequently, the state information generation unit 26 outputs the generated state information to the reminder generation unit 28.

(Step S105) The reception unit 27 determines whether or not the reception unit 27 receives notice information. When the reception unit 27 determines that the reception unit 27 receives notice information (Step S105; YES), the reception unit 27 advances the process to Step S106. When the reception unit 27 determines that the reception unit 27 does not receive notice information (Step S105; NO), the reception unit 27 brings the process back to Step S104.

(Step S106) The reminder generation unit 28 determines whether or not a trigger condition is satisfied (FIG. 8, P106). The trigger condition is whether or not the notice information is input from the state information generation unit 26 to the reminder generation unit 28 in a first predetermined time from when the reception unit 27 outputs the notice information.

(Step S107) When the reminder generation unit 28 determines that the trigger condition is satisfied (Step S107; YES), the reminder generation unit 28 advances the process to Step S108. When the reminder generation unit 28 determines that the trigger condition is not satisfied (Step S107; NO), the reminder generation unit 28 brings the process back to Step S104.

(Step S108) The reminder generation unit 28 determines that the current position is in a predetermined range that includes the target position and the current time is in a second predetermined time that includes the target time and generates a reminder.

(Step S109) The notification unit 29 notifies the user of the reminder output by the reminder generation unit 28 by using at least one of an image, speech, vibration, and the like (FIG. 8, P107).

(Step S110) When the reminder is output to the notification unit 29, the reminder generation unit 28 transmits performance information to which the identifier and the target time information are added to the information processing apparatus 4 via the transmission unit 24 (FIG. 8, P108).

Then, the process of the terminal 2 is completed.

<Example of Process Sequence of Information Processing Apparatus 4>

Figure 10:
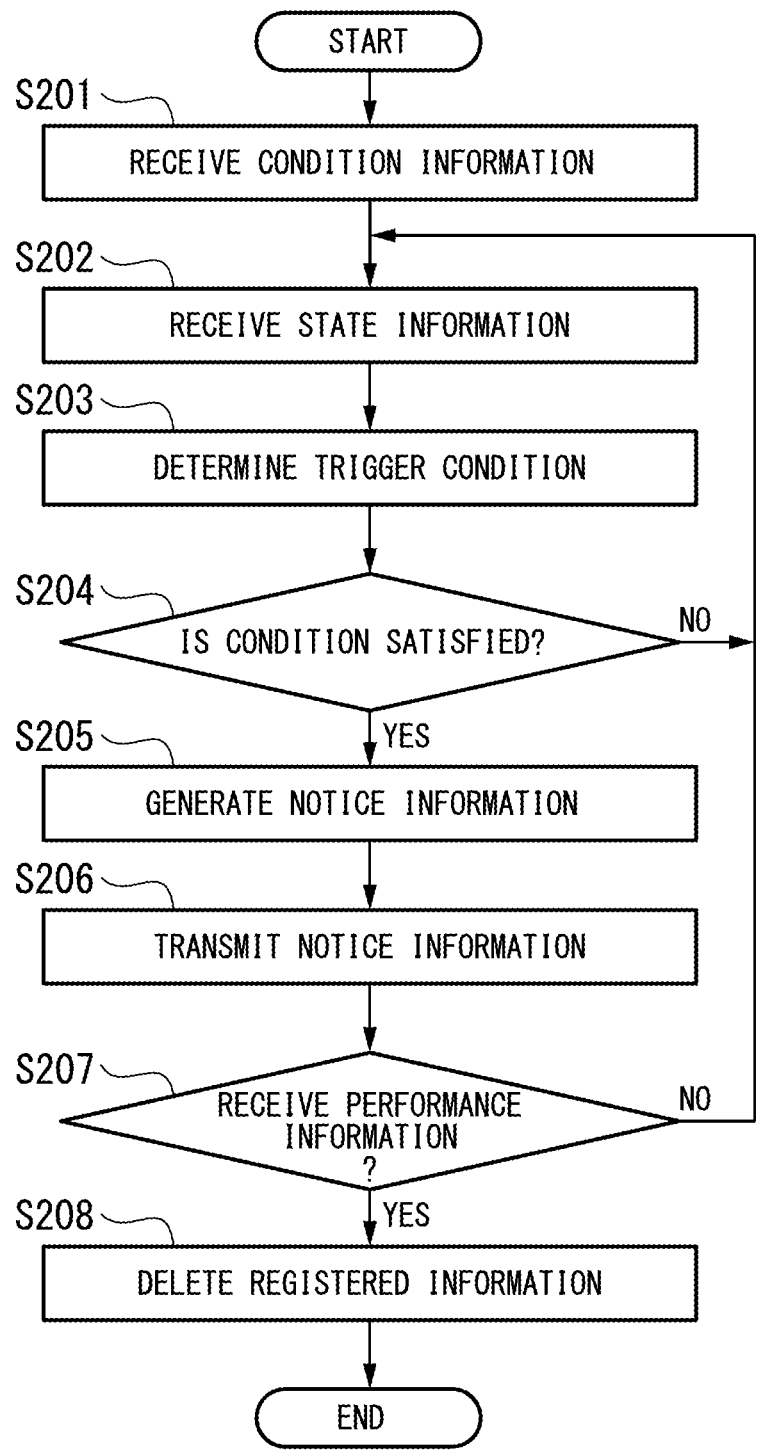
FIG. 10 is a flowchart showing an example of a process sequence of the information processing apparatus according to the present embodiment.

Next, an example of a process sequence of the information processing apparatus 4 is described using FIG. 10 with reference to FIG. 8. FIG. 10 is a flowchart showing an example of a process sequence of the information processing apparatus 4 according to the present embodiment.

(Step S201) The acquisition unit 41 receives condition information transmitted by the terminal 2.

(Step S202) The acquisition unit 41 receives state information transmitted by the terminal 2.

(Step S203) When the state information is input from the state information processing unit 45, the condition determination unit 46 determines, with reference to the reminder database 44, whether or not a trigger condition is satisfied (FIG. 8, P104). The trigger condition is whether or not current position information included in the state information is in a predetermined range having a center at a coordinate of a target position in association with an identifier.

(Step S204) When the condition determination unit 46 determines that the trigger condition is satisfied (Step S204; YES), the condition determination unit 46 advances the process to Step S205. When the condition determination unit 46 determines that the trigger condition is not satisfied (Step S204; NO), the condition determination unit 46 brings the process back to Step S202.

(Step S205) When the condition determination unit 46 determines that a current position is in a predetermined range, the condition determination unit 46 generates notice information indicating that the terminal 2 is present in the predetermined range.

(Step S206) The condition determination unit 46 transmits the generated notice information to the terminal 2 via the output unit 47 (FIG. 8, P105).

(Step S207) The condition determination unit 46 determines whether or not the condition determination unit 46 receives performance information from the state information processing unit 45. When the condition determination unit 46 determines that the condition determination unit 46 receives performance information (Step S207; YES), the condition determination unit 46 advances the process to Step S208. When the condition determination unit 46 determines that the condition determination unit 46 does not receive performance information (Step S207; NO), the condition determination unit 46 brings the process back to Step S202.

(Step S208) The condition determination unit 46 deletes, from the reminder database 44, target time information and the coordinate of the target position in association with the identifier included in the performance information.

Then, the process of the information processing apparatus 4 is completed.

<Specific Example of Process of Information Processing System 1>

A specific example of a process performed by the information processing system 1 is described with reference to FIG. 8 and the like.

For example, a user inputs notice condition information "an appointment at the AA building (target position) at Shibuya at seventeen o'clock, July 7, 2015 (target time)" in the display image indicated by the reference numeral g101 or the reference numeral g102 of FIG. 5 by operating the touch sensor 213 of the terminal 2 (FIG. 8, P101).

Next, the terminal 2 transmits, to the information processing apparatus 4, at least target position information as condition information of the input notice condition information (FIG. 8, P102). As described above, an identifier is imparted to the transmitted condition information. Next, the information processing apparatus 4 writes the received condition information on the reminder database 44.

Next, the terminal 2 acquires current position information and current time information at a predetermined time interval and transmits the current position information as condition information to the information processing apparatus 4 (FIG. 8, P103). As described above, the identifier is imparted to the transmitted state information. Next, the information processing apparatus 4 writes the received state information on the reminder database 44.

Next, the information processing apparatus 4 performs a determination with respect to a trigger condition in response to whether or not the current position at which the terminal 2 is used is in a predetermined range that includes the target position (FIG. 8, P104).

Next, when the information processing apparatus 4 determines that the current position at which the terminal 2 is used is in the predetermined range that includes the target position, the information processing apparatus 4 generates notice information and transmits the generated notice information to the terminal 2 (FIG. 8, P105).

Next, when the terminal 2 receives the notice information, the terminal 2 performs a determination with respect to a trigger condition in response to whether or not the current time is in a second predetermined time that includes the target time (FIG. 8, P106).

Next, when the current time is in the second predetermined time that includes the target time, the terminal 2 generates a reminder and performs notification of the generated reminder on the notification unit 29 by using an image like the display image of the reference numeral g103 of FIG. 5 (FIG. 8, P107).

Next, since the terminal 2 has performed notification of the reminder from the notification unit 29, the terminal 2 transmits performance information to the information processing apparatus 4 (FIG. 8, P108). As described above, the identifier is imparted to the transmitted performance information. Next, the information processing apparatus 4 deletes, from the reminder database 44, target time information and the coordinate of the target position in association with the identifier included in the performance information.

As described above, in the present embodiment, the information processing apparatus 4 performs a determination of a trigger condition only with respect to the position of the terminal 2, for example, as shown in FIG. 6, and the terminal 2 performs a determination of a trigger condition only with respect to a point in time in response to the notice information transmitted from the information processing apparatus 4. Thereby, in the present embodiment, the information processing apparatus 4 does not perform all the reminder notification processes as in the related art but can perform the processes such that part of the processes are distributed to the terminal 2. As a result, according to the present embodiment, in an information processing system in which a reminder is sent, it is possible to reduce a load in the information processing apparatus 4. Further, compared to a case in which only the terminal 2 performs a determination of a trigger condition with respect to the position and the time using an application that is installed in the terminal 2 and performs notification of a reminder, it is possible to reduce a load of the terminal 2, and it is possible to reduce a power consumption of the terminal 2.

The above embodiment is described using an example in which the terminal 2 transmits only target position information as condition information to the information processing apparatus 4; however, the embodiment is not limited thereto. The terminal 2 may transmit only target time information as condition information or may transmit both target position information and target time information as condition information. The condition information transmitted from the terminal 2 to the information processing apparatus 4 is determined in advance. Alternatively, when information included in the condition information received from the terminal 2 is one, the information processing apparatus 4 may determine whether the included information is target position information or is target time information. An information processing terminal may perform a process in which notice information is generated in accordance with the received condition information.

The terminal 2 may transmit only current time information as state information. Alternatively, the terminal 2 may transmit all of current position information, current time information, and sensor information as state information. The state information transmitted from the terminal 2 to the information processing apparatus 4 is determined in advance.

When there are a plurality of identifiers indicating a terminal 2 for which notice condition information is registered, the information processing apparatus 4 performs the above-described process for each terminal 2. For example, when the number of identifiers for which a target position Tg is registered is one hundred, the information processing apparatus 4 determines whether or not each of the hundred terminals 2 is in a predetermined range. When it is determined that ten of the hundred terminals 2 are in the predetermined range, the information processing apparatus 4 transmits notice information to the ten terminals 2 each corresponding to one of the ten identifiers. In this way, the information processing apparatus 4 determines only whether or not the terminal 2 is in the predetermined range and does not determine whether or not the time when the terminal 2 is in the predetermined range is in a second predetermined time. In this way, as the number of the terminals 2 that use the present system is increased, a load of the information processing apparatus 4 can be further reduced according to the present embodiment compared to the related art.

As described above, an information processing system 1 according to the present embodiment is an information processing system that includes a terminal 2 and an information processing apparatus 4, wherein the terminal includes: a condition information generation unit 22 that acquires a first condition (target position information) and a second condition (target time information) and uses at least one of the acquired first condition and the acquired second condition to generate condition information; a state information generation unit 26 that acquires information based on the first condition and information based on the second condition and uses information that corresponds to the condition information of the acquired information to generate state information; a transmission unit 24 that transmits the condition information to the information processing apparatus and transmits the state information to the information processing apparatus at a predetermined time interval; a reception unit 27 that receives notice information from the information processing apparatus; a reminder generation unit 28 that generates a reminder when it is determined that the state information satisfies one of the first condition and the second condition when receiving the notice information; and a notification unit 29 that notifies a user of the generated reminder, and wherein the information processing apparatus includes: an acquisition unit 41 that acquires the condition information and the state information transmitted by the terminal; a condition determination unit 46 that generates the notice information when it is determined that the acquired state information satisfies one of the first condition and the second condition included in the condition information; and an output unit 47 that transmits the notice information to the terminal.

According to the configuration, in the present embodiment, at least one condition information of the notice conditions acquired by the terminal 2 is transmitted to the information processing apparatus 4, and thereafter information based on the transmitted condition information is transmitted to the information processing apparatus 4. Thereby, the information processing apparatus 4 determines whether or not the condition information transmitted by the terminal 2 is in a predetermined range not with respect to all the plurality of condition information but with respect to at least one condition information. In the information processing system 1, the terminal 2 determines whether or not the rest of the condition information is in the predetermined range. Thereby, in the present embodiment, since the information processing apparatus 4 does not perform all the reminder notification processes as in the related art but can perform the processes such that part of the processes are distributed to the terminal 2, it is possible to reduce a load in the information processing apparatus 4 (server).

In the information processing system 1 according to the present embodiment, the first condition is a target position, the second condition is a target time, the information based on the first condition is information indicating a current position, and the information based on the second condition is information indicating a current time.

According to the configuration, in the present embodiment, when the target position information is transmitted as the condition information, thereafter, the terminal 2 transmits the current position information. Alternatively, when the target time information is transmitted as the condition information, thereafter, the terminal 2 transmits the current time information. Thereby, the information processing apparatus 4 determines whether or not only the position or the time of the condition information transmitted by the terminal 2 is in the predetermined range. In the information processing system 1, the terminal 2 determines whether or not the rest of the condition information is in the predetermined range. Thereby, in the present embodiment, the reminder notification process can be performed in a distributed manner such that the terminal 2 performs a process with respect to a point in time and the information processing apparatus 4 performs a process with respect to a position, and therefore, it is possible to reduce a load in the information processing apparatus 4 (server).

In the information processing system 1 according to the present embodiment, the terminal 2 generates performance information indicating that the user has been notified of the reminder and transmits the generated performance information to the information processing apparatus 4, and the information processing apparatus terminates a determination whether or not the state information satisfies one of the first condition and the second condition included in the condition information in response to the received performance information.

According to the configuration, in the present embodiment, performance information indicating that the user has been notified of the reminder is automatically transmitted from the terminal 2 to the information processing apparatus 4, and therefore, in response to the performance information, the information processing apparatus 4 can delete, from the reminder database 44, information for which notification of the reminder has been performed. Thereby, in the present embodiment, it is unnecessary to perform a determination of a trigger condition with respect to the information deleted from the reminder database 44, and therefore, it is possible to reduce a load of the information processing apparatus 4.

In the information processing system 1 according to the present embodiment, the notification unit 29 of the terminal 2 notifies the user of the reminder by using at least one of an image, speech, and vibration.

According to the configuration, in the present embodiment, notification can be performed by using at least one of the image, speech, and vibration.

A terminal information processing method according to the present embodiment includes: (a) by way of a condition information generation unit 22, acquiring a first condition (target position information) and a second condition (target time information) (Step S101) and using at least one of the acquired first condition and the acquired second condition to generate condition information (for example, target position information) (Step S102); (b) by way of a transmission unit 24, transmitting the condition information to an information processing apparatus 4 (Step S102); (c) by way of a state information generation unit 26, acquiring information (current position information) based on the first condition and information (current time information) based on the second condition (Step S103) and using information (for example, current position information) that corresponds to the condition information of the acquired information to generate state information (Step S104); (d) by way of the transmission unit, transmitting the state information to the information processing apparatus at a predetermined time interval (Step S104); (e) by way of a reception unit 27, receiving notice information from the information processing apparatus (Step S105); (f) by way of a reminder generation unit 28, generating a reminder when it is determined that the state information satisfies one of the first condition and the second condition when receiving the notice information (Step S106 to Step S108); and (g) by way of a notification unit 29, notifying a user of the reminder generated in (f) (Step S110).

According to the process, in the present embodiment, the terminal 2 transmits condition information that is processed at the information processing apparatus 4 and receives notice information that is a determination result of a trigger condition transmitted by the information processing apparatus 4. When receiving the notice information, the terminal 2 can compare target time information and current time information acquired at the terminal 2 to perform a determination of a trigger condition. In this way, according to the present embodiment, the reminder notification process can be performed by the terminal 2 and the information processing apparatus 4 in a distributed manner, and therefore, it is possible to reduce a load of the terminal 2 and a load of the information processing apparatus 4. Further, the load of the terminal 2 is reduced, and therefore, it is possible to reduce a power consumption required for the reminder notification process of the terminal 2.

The above embodiment is described using an example in which the terminal 2 acquires detection information (current position information, current time information, sensor information) at a predetermined time interval and transmits state information based on the acquired detection information to the information processing apparatus 4; however, the embodiment is not limited thereto. For example, the information acquisition interval or the information transmission interval may be changed depending on a distance between the target position and the current position.

Figure 11:
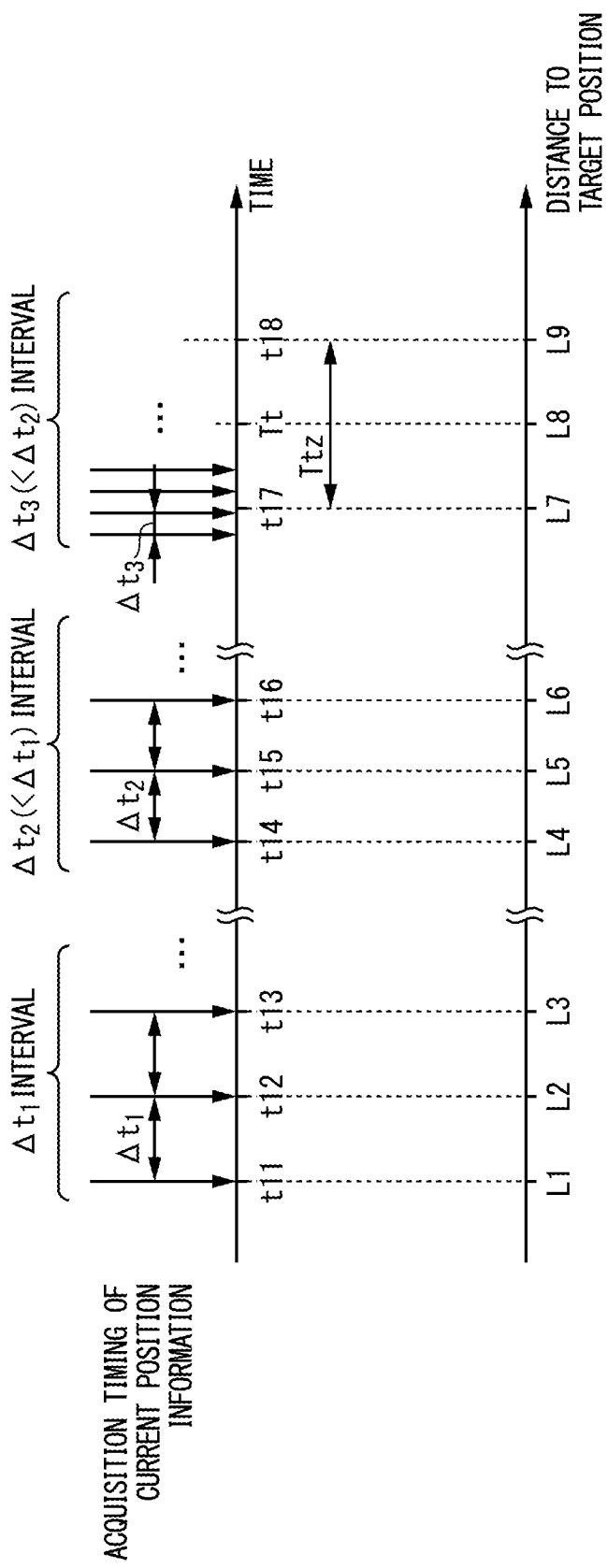
FIG. 11 is a view showing an example in which a predetermined time interval at which current position information is acquired is changed depending on a distance to a target position according to the present embodiment.

FIG. 11 is a view showing an example in which a predetermined time interval at which current position information is acquired is changed depending on a distance to a target position according to the present embodiment. In FIG. 11, the upper horizontal axis represents time, and the lower horizontal axis represents a distance to a target position. In FIG. 11, a distance L1 is the longest distance to the target position, a distance L2 is shorter than the distance L1, a distance L3 is shorter than the distance L2, and a distance L4 is shorter than the distance L3. A distance L5 is shorter than the distance L4, a distance L6 is shorter than the distance L5, a distance L7 is shorter than the distance L6, a distance L8 is shorter than the distance L7, and a distance L9 is shorter than the distance L8. A time Tt and a second predetermined time Ttz are the same as those of FIG. 7.

As shown in FIG. 11, in the case of the distances L1 to L3 having a distance far from the target position, a predetermined time interval of acquisition and transmission is $\Delta t_1$. That is, the terminal 2 acquires current position information at a timing of times t11, t12, and t13 and transmits the acquired current position information as state information to the information processing apparatus 4.

In the case of the distances L4 to L6 having a shorter distance to the target position than the distances L1 to L3, the predetermined time interval of acquisition and transmission is $\Delta t_2$ that is smaller than $\Delta t_1$.

In the case of the distances L7 to L9 having a further shorter distance to the target position than the distances L4 to L6, the predetermined time interval of acquisition and transmission is $\Delta t_3$ that is further smaller than $\Delta t_2$. At the distance L7, the predetermined time interval may be set to $\Delta t_3$ at a time prior to a predetermined value for the distance L7 as shown in FIG. 11. Thereby, the information processing apparatus 4 that acquires the current position information can easily detect the time when the terminal 2 enters a predetermined range.

In the present embodiment, as shown in FIG. 11, the interval of acquisition and transmission of the current position information is changed depending on the distance to the target position, and thereby, it is possible to reduce the number of communications with a GPS satellite or communications with a base station compared to a case in which reception and transmission of information are performed, for example, at the predetermined time interval $\Delta t_3$ at all the distances. Thereby, in the present embodiment, it is possible to reduce a power consumption of the terminal 2.

Further, as shown in FIG. 11, in a case where the distance is far from the target position, there is no problem in the determination of a trigger condition even when the predetermined time interval of acquisition and transmission is long. On the other hand, in the case of a position closer to the target position, an accuracy of the current position is required, and therefore, the predetermined time interval of acquisition and transmission of the current position is preferably short. Therefore, in the present embodiment, as shown in FIG. 11, the interval of reception and transmission of information when the distance to the target position is small is shorten compared to a case where the distance to the target position is large. Thereby, according to the present embodiment, even when the interval of reception and transmission of information is changed, it is possible to ensure the accuracy of the current position.

As described above, according to the present embodiment, it is possible to ensure the detection accuracy whether or not the terminal 2 is in a predetermined range that includes a target position while reducing the power consumption of the terminal 2.

As described above, in the information processing system 1 of the present embodiment, the terminal 2 changes the predetermined time interval at which the current position is acquired and transmitted depending on a distance between the current position included in the current position information and the target position included in the target position information.

According to the configuration, in the present embodiment, it is possible to ensure the detection accuracy whether or not the terminal 2 is in a predetermined range that includes the target position while reducing the power consumption of the terminal 2.

In FIG. 11, an example is described in which the terminal 2 acquires and transmits current position information; however, the information that is acquired and is transmitted may be current time information or sensor information. Even in this case, it is possible to obtain an effect similar to the above-described effect.

The present embodiment is described using an example in which as examples of the notice condition information, the first condition is target position information, and the second condition is target time information; however, the embodiment is not limited thereto. The notice condition is not limited to the two conditions and may include, for example, information that indicates an object of notification of a reminder and the like. Further, the first condition may be target time information, and the second condition may be target position information.

The above-described process may be performed by recording a program for realizing part of or all the functions of the terminal 2 or the information processing apparatus 4 included in the information processing system 1 in the present invention on a computer-readable recording medium, reading the program recorded on the recording medium into a computer system, and executing the program. Here, the "computer system" may include an OS or hardware such as peripherals. The "computer system" may include a WWW system including a homepage-providing environment (or display environment). Examples of the "computer-readable recording medium" include portable mediums such as a flexible disk, a magneto-optical disk, a ROM, and a CD-ROM and a storage device such as a hard disk built in a computer system. The "computer-readable recording medium" may include a medium that temporarily holds a program for a predetermined time, such as a volatile memory (RAM) in a computer system serving as a server or a client in a case where the program is transmitted via a network such as the Internet or a communication circuit such as a telephone circuit.

The program may be transmitted from a computer system storing the program in a storage device or the like to another computer system via a transmission medium or by transmission waves in the transmission medium. Here, the "transmission medium" via which the program is transmitted means a medium having a function of transmitting information such as a network (communication network) such as the Internet or a communication circuit (communication line) such as a telephone line. The program may be configured to realize part of the above-described functions. Further, the program may be configured to realize the above-described functions by combination with a program recorded in advance in a computer system, such as a so-called differential file (differential program).

For example, a user operates the terminal 2 and downloads an application that causes the terminal 2 to perform the above-described process, for example, from the Internet. Then, the terminal 2 installs the downloaded application on the terminal 2. Thereby, part of the function units included in the terminal 2 may be realized.

While embodiments of the invention have been described and shown in the drawings, it should be understood that the present invention is not limited to the above embodiments, and additions, omissions, substitutions, and other modifications of the configuration can be made without departing from the scope of the present invention. Accordingly, the invention is not to be considered as being limited by the foregoing descriptions, and is only limited by the scope of the appended claims.

The invention claimed is:

1. An information processing system comprising a terminal and an information processing apparatus, wherein
the terminal comprises:
a condition information generation unit that acquires a first condition and a second condition and uses at least one of the acquired first condition and the acquired second condition to generate condition information;
a state information generation unit that acquires information based on the first condition and information based on the second condition and uses information that corresponds to the condition information of the acquired information to generate state information;
a transmission unit that transmits the condition information to the information processing apparatus and transmits the state information to the information processing apparatus at a predetermined time interval;
a reception unit that receives notice information from the information processing apparatus;
a reminder generation unit that generates a reminder when it is determined that the state information satisfies one of the first condition and the second condition when receiving the notice information; and
a notification unit that notifies a user of the generated reminder, and wherein
the information processing apparatus comprises:
an acquisition unit that acquires the condition information and the state information transmitted by the terminal;
a condition determination unit that generates the notice information when it is determined that the acquired state information satisfies one of the first condition and the second condition included in the condition information; and
an output unit that transmits the notice information to the terminal.

2. The information processing system according to claim 1, wherein
the first condition is target position information,
the second condition is target time information,
the information based on the first condition is current position information indicating a current position, and
the information based on the second condition is current time information indicating a current time.

3. The information processing system according to claim 2, wherein
the terminal changes the predetermined time interval at which the current position is acquired and transmitted depending on a distance between the current position included in the current position information and a target position included in the target position information.

4. The information processing system according to claim 1, wherein
the terminal generates performance information indicating that the user has been notified of the reminder and transmits the generated performance information to the information processing apparatus, and
the information processing apparatus terminates a determination whether or not the state information satisfies one of the first condition and the second condition included in the condition information in response to the received performance information.

5. The information processing system according to claim 1, wherein
the notification unit of the terminal notifies the user of the reminder by using at least one of an image, speech, and vibration.

6. The information processing system according to claim 2, wherein
in the terminal,
the condition information generation unit acquires the target position information and the target time information and uses the acquired target position information to generate the condition information;
the state information generation unit acquires the current position information based on the target position information and the current time information based on the target time information and uses the current position information that corresponds to the condition information of the acquired information to generate the state information; and the reminder generation unit generates the reminder when it is determined that the current time information satisfies the target time information when receiving the notice information, and in the information processing apparatus, the condition determination unit generates the notice information when it is determined that the current position information included in the state information satisfies the target position information included in the condition information.

7. A terminal comprising:
a condition information generation unit that acquires a first condition and a second condition and uses at least one of the acquired first condition and the acquired second condition to generate condition information;
a state information generation unit that acquires information based on the first condition and information based on the second condition and uses information that corresponds to the condition information of the acquired information to generate state information;
a transmission unit that transmits the condition information to an information processing apparatus and transmits the state information to the information processing apparatus at a predetermined time interval;
a reception unit that receives notice information from the information processing apparatus;
a reminder generation unit that generates a reminder when it is determined that the state information satisfies one of the first condition and the second condition when receiving the notice information; and
a notification unit that notifies a user of the generated reminder.

8. An information processing method in an information processing system that comprises a terminal and an information processing apparatus, comprising:
(a) by way of a condition information generation unit of the terminal, acquiring a first condition and a second condition and using at least one of the acquired first condition and the acquired second condition to generate condition information;
(b) by way of a transmission unit of the terminal, transmitting the condition information to the information processing apparatus;
(c) by way of an acquisition unit of the information processing apparatus, acquiring the condition information transmitted by the terminal;
(d) by way of a state information generation unit of the terminal, acquiring information based on the first condition and information based on the second condition and using information that corresponds to the condition information of the acquired information to generate state information;
(e) by way of the transmission unit of the terminal, transmitting the state information to the information processing apparatus at a predetermined time interval;
(f) by way of an acquisition unit of the information processing apparatus, acquiring the state information transmitted by the terminal;
(g) by way of a condition determination unit of the information processing apparatus, generating notice information when it is determined that the state information acquired in (c) satisfies one of the first condition and the second condition included in the condition information;
(h) by way of an output unit of the information processing apparatus, transmitting the notice information to the terminal;
(i) by way of a reception unit of the terminal, receiving the notice information from the information processing apparatus;
(j) by way of a reminder generation unit of the terminal, generating a reminder when it is determined that the state information satisfies one of the first condition and the second condition when receiving the notice information; and
(k) by way of a notification unit of the terminal, notifying a user of the reminder generated in (j).

9. A terminal information processing method, comprising:
(a) by way of a condition information generation unit, acquiring a first condition and a second condition and using at least one of the acquired first condition and the acquired second condition to generate condition information;
(b) by way of a transmission unit, transmitting the condition information to an information processing apparatus;
(c) by way of a state information generation unit, acquiring information based on the first condition and information based on the second condition and using information that corresponds to the condition information of the acquired information to generate state information;
(d) by way of the transmission unit, transmitting the state information to the information processing apparatus at a predetermined time interval;
(e) by way of a reception unit, receiving notice information from the information processing apparatus;
(f) by way of a reminder generation unit, generating a reminder when it is determined that the state information satisfies one of the first condition and the second condition when receiving the notice information; and
(g) by way of a notification unit, notifying a user of the reminder generated in (f).

10. A non-transitory computer-readable recording medium comprising a program that causes a computer of a terminal to execute:
(a) acquiring a first condition and a second condition and using at least one of the acquired first condition and the acquired second condition to generate condition information;
(b) transmitting the condition information to an information processing apparatus;
(c) acquiring information based on the first condition and information based on the second condition and using information that corresponds to the condition information of the acquired information to generate state information;
(d) transmitting the state information to the information processing apparatus at a predetermined time interval;
(e) receiving notice information from the information processing apparatus;
(f) generating a reminder when it is determined that the state information satisfies one of the first condition and the second condition when receiving the notice information; and
(g) notifying a user of the reminder generated in (f).

* * * * *